3,183,282
NON-AQUEOUS SOLUTIONS OF ACRYLIC ESTER/
ACID COPOLYMER AND THERMOSETTING
ALKYLATED AMINOPLAST RESIN-FORMING
CONDENSATE
Melvin D. Hurwitz, Huntingdon Valley, Pa., assignor to
 Rohm & Haas Company, Philadelphia, Pa., a corporation of Delaware
No Drawing. Filed July 27, 1956, Ser. No. 600,406
23 Claims. (Cl. 260—856)

This invention relates to novel essentially non-aqueous compositions of matter comprising a mixture of a thermosetting alkylated aminoplast resin-forming condensate and a thermoplastic copolymer of (1) 1 to 10 mole percent of an acid selected from the group consisting of acrylic acid, methacrylic acid, and itaconic acid and (2) 90 to 99 mole percent of at least one alkyl ester of one of said acids. This invention further relates to surface coating compositions comprising a mixture of a thermosetting alkylated aminoplast resin-forming condensate and a copolymer as defined above dissolved in a compatible volatile organic solvent. Still further, this invention relates to surface coating compositions which, on baking, yield hard, insoluble, homogeneous films which are characterized not only by good gloss and color but also by chemical and heat resistance. This invention further relates to novel compositions of matter which are particularly useful as vehicles in enamels, clear coatings, printing inks, floor coverings, in abrasive binders and the like and particularly for stove, automotive, and refrigerator enamels.

This invention further relates to surface coating compositions which comprise 5 to 95 parts by weight of a linear thermoplastic copolymer of (1) from 1 to 10 mole percent of an acid selected from the group consisting of acrylic acid, methacrylic acid, and itaconic acid and (2) 90 to 99 mole percent of at least one alkyl ester of one of said acids and 5 to 95 parts by weight of a thermosetting alkylated aminoplast resin-forming condensate in a compatible volatile organic solvent. The invention is especially valuable for producing thermoset coatings from mixtures containing 50 to 65 parts by weight of linear thermoplastic copolymer defined above and from 50 to 35 parts by weight respectively of the aminoplast defined above. Such coating compositions provide a highly efficient yet economical system for making insoluble and infusible coatings of homogeneous character from organic solvent solutions of a film-forming material comprising a predominant proportion of thermoplastic component and a minor but substantial proportion of aminoplast which is reactive with the acid groups in the thermoplastic copolymer. It is essential for many purposes that the amount of aminoplast in the mixture be at least sufficient to provide 1.5 equivalents of oxymethyl therein for each equivalent of carboxyl in the copolymer. By "oxymethyl" it is intended to include both alkoxymethyl and hydroxymethyl (or methylol) groups.

The copolymers of the acrylic acid, methacrylic acid, and/or itaconic acid may be any of those with at least one alkyl ester of one of these acids in which the alkyl group contains from 1 to 18 carbon atoms. When itaconates are used, however, it is generally desirable that the total of the itaconate units in the copolymer does not exceed 20 mole percent. The esters of these acids may be derived from such alcohols as methanol, ethanol, propanol, isopropanol, n-butanol, isobutanol, t-butanol, pentanols, and hexanol, octanol, dodecanol, hexadecanol, or octadecanol. Of course, mixtures of such esters may be employed and should be employed when an itaconic acid ester is used. When extremely hard coatings are desired, esters of methacrylic acid with the lower alcohols having from 1 to 4 carbon atoms are used exclusively or in predominant proportion of the ester component. The copolymers may be made in any conventional way, such as by copolymerization by the bulk, solution, suspension, or emulsion techniques. If desired, the copolymerization may be effected in organic solvents which are intended to be employed as the solvents during application as in coating. When the emulsion technique is employed, the copolymer may be coagulated and then dissolved in the solvent in which it is to be used as in coating. Obviously, the copolymers obtained by bulk and suspension techniques may be dissolved in the organic solvent to prepare the composition for use. The acid and ester comonomers may be mixed in the desired proportion before initiating polymerization and the entire amount of the monomers may be so mixed. Alternatively, one or more of the monomers may be polymerized before one or more others is or are added subsequently during polymerization so as to produce block- or graft-copolymers rather than the normal heterogeneous or homogeneous types. It is only essential in accordance with the invention that the copolymer be a linear thermoplastic copolymer which is insoluble in water and contains either homogeneously-distributed or irregularly-distributed through the copolymer molecule 1 to 10 mole percent of units containing carboxylic acid groups in free acid form.

In the preparation of the composition of the present invention, one may use any of the thermosetting alkylated aminoplast resin-forming condensates, such as the urea-aldehyde resins, the melamine aldehyde resins, the dicyandiamide-aldehyde resins and other aminoplast-aldehyde resins such as those triazine resins produced by the reaction of an aldehyde with formoguanamine, benzoguanamine, ammeline, 2-chloro-4,6-diamino-1,3,5-triazine, 2-phenyl-p-oxy-4,6-diamino-1,3,5-triazine, 6-methyl-2,4-di-amino-1,3,5-triazine, 2,4,6-trihydrazine-1,3,5-triazine, and 2,4,6-triethyltriamino-1,3,5-triazine. The mono-, di-, or triaralkyl or mono-, di-, or tri-aryl melamines, for instance, 2,4,6-triphenyltriamino-1,3,5-triazine and the like. As aldehydes used to react with the amino compound to form the resinous material, one may use such aldehydes as formaldehyde, acetaldehyde, crotonic aldehyde, acrolein, or compounds which engender aldehydes, such as hexamethylenetetramine, paraldehyde, paraformaldehyde, trioxymethylene and the like. Still further, one may use aromatic or heterocyclic aldehydes such as benzaldehyde, furfural and the like.

Among the alcohols which may be used in the preparation of the alkylated aminoplast resins are methyl alcohols, ethyl alcohol, butyl alcohol, 2-ethyl-butanol, 2-ethyl-hexanol, benzyl alcohol, lauryl alcohol, oleyl alcohol, stearyl alcohol and the like which provide alkoxymethyl groups having from 2 to 19 carbon atoms therein. In most cases, an alcohol containing from 1 to 6 carbons is used providing alkoxymethyl groups of 2 to 7 carbon atoms and preferably the alcohols contain from 1 to 4 carbon atoms providing alkoxymethyl groups of 2 to 5 carbon atoms. Although any of the alkylated aminoplast resins may be used, it is preferred that the butylated aminoplast resins be used, because of their improved compatibility with the polymers and copolymers of the present invention.

In the usual preparation of the thermosetting alkylated aminoplast resin, a certain amount of organic solvent, such as an alcohol, is commonly present. This solvent may serve as the common solvent for the aminoplast as well as the copolymer which may be added to the aminoplast solution. Besides using any of the alcohols mentioned hereinabove, other solvents may be used instead or in addition thereto. Such additional solvents include esters such as ethyl acetate, ethoxyethyl acetate, butoxyethyl acetate, acetone, butanone, methyl ethyl ketone, dioxane, dimethylformamide, dimethylacetamide, nitroparaffins, such as nitroethane, and nitropropane, acetonitrile, aromatic hydrocarbons, such as xylene, toluene, benzene, chlorinated hydrocarbons, such as chloroform, carbon tetrachloride, ethylene dichloride, and the like.

Depending upon the particular method of application, the concentration of the composition may vary widely. For example, the solution of the aminoplast and copolymer may contain from 1% up to about 50% by weight of the mixture of the aminoplast and copolymer (solids). For coating purposes, the composition may be applied by spraying, dipping, brushing, roll-transfer, or in any other suitable manner.

After application of the composition to a surface, it may be allowed to dry by exposure to normal atmospheric air currents. Alternatively, it may be dried by application of heated air, by application of infrared rays, radio frequency currents, or in any other suitable manner. After drying or during drying, curing is effected by heating to a temperature of about 200° F. to 400° F. or higher for a period of time that generally is inversely proportional to the temperature and may be from about 30 seconds to an hour or so. The combined factors of temperature and time depend upon the particular solvent used and the thickness of coating.

The compositions may be pigmented if clear coatings are not desired. For this purpose, there may be incorporated into the composition an amount of pigment, extender, filler, delustrant, or the like, such that the weight ratio of binder solids (including the aminoplast and copolymer) to pigment is from 2:1 to 1:20, depending upon the particular effect desired. For most purposes, the ratio of binder to pigment may be from 1:2 to 1:6. Any pigments which are not sensitive to the acid groups of the copolymer may be employed including titanium dioxide, copper phthalocyanine, ultramarine blue, zirconium oxide, lead chromate, barium sulfate, zinc chromate, carbon black, and so on.

The acid groups in the copolymer provide several important functions in the composition. In the first place, they improve the compatibility of the copolymer with the aminoplast in the organic solvent system, especially when a large proportion of aminoplast is used, such as in excess of about 30% thereof, based on the total of aminoplast and copolymer. The acid groups also provide a source of catalytic action for accelerating the conversion of the aminoplast to insoluble and infusible condition during the curing action. Not only do the acid groups have a catalytic function during the curing but they also take part in the curing action by co-reacting with the aminoplast. During such co-reaction, the carboxyl groups are practically completely converted to non-corrosive derivatives. Thus, the copolymer takes part in the reaction by which the composition is rendered infusible and insoluble.

The aminoplast in the composition reacts with the carboxyl groups of the copolymer to effect cross-linking thereof to an insoluble and infusible condition. In order to assure that all of the carboxyl groups are eliminated, and thereby converted into a non-corrosive modification, there should be present in the composition sufficient aminoplast to provide 1.5 equivalents of oxymethyl as defined hereinabove for each equivalent of carboxyl in the copolymer. This requirement provides for a lower limit on the aminoplast but any larger amount of the aminoplast may be employed. When a copolymer is chosen containing 10 mole percent of one of the acids mentioned, it is necessary to use somewhat more than the 5% lower limit of the broad aminoplast range specified hereinabove in order to provide the necessary 1.5 equivalents of oxymethyl per equivalent of carboxyl.

The coatings may be applied to all sorts of surfaces for a wide variety of purposes. They are particularly desirable for application to the surface of metals, such as iron, steel, copper, brass, aluminum, chromium, nickel, and the like; to glass, porcelain and other vitreous materials; to articles made of plastic materials, such as of methyl methacrylate or copolymers thereof; wood, textile fabrics, leather, paper, cardboard, and so on.

The compositions of the present invention are adapted for the pigment-printing and-dyeing of textiles, for the permanent sizing or finishing of textile fabrics and papers either in pigmented or clear form and they are characterized by excellent adhesion to all sorts of substrates and especially to metals and glass, by good gloss, by hardness, by resistance to attack by solvents, resistance to heat, resistance to ultraviolet light, and they are characterized by good cohesion, compatibility, clarity, and strength.

The following examples are illustrative of the present invention:

*Example 1*

One hundred parts of a 50% solution in ethoxyethyl acetate of a copolymer of 35 mole percent of methyl methacrylate, 55 mole percent of ethyl acrylate and 10 mole percent of methacrylic acid is mixed with 100 parts of a 60% solution in a 1:1 (wt. ratio) mixture of n-butanol and xylene of a butylated methylolated benzoguanamine (prepared essentially by the procedure used in making Resin C in 2,681,897, except that xylol is substituted for the benzene). Panels of steel and glass are coated with the mixture and, after being dried, the coated panels are heated to 350° F. for 40 minutes. The clear coatings obtained have a Knoop hardness of 15.6 and are resistant to ethoxyethyl acetate.

*Example 2*

The procedure of Example 1 is repeated except that the amount of aminoplast solution used is reduced to 50 parts. The clear coatings have a Knoop hardness of 13.7.

*Example 3*

The procedure of Example 1 is repeated substituting, for the aminoplast solution, 20 parts of a 50% solution in a 1:1 (wt. ratio) of methanol and toluene of a methylated dimethylolurea.

*Example 4*

50 parts of a 50% solution in ethoxyethyl acetate of a copolymer of 35 mole percent methyl methacrylate, 55 mole percent of ethyl acrylate and 10 mole percent of acrylic acid is mixed with 50 parts of a 60% solution in a 60:40 (wt. ratio) mixture of n-butanol and xylene of a butylated urea-formaldehyde condensate (like Resin B of 2,681,897). Clear coatings are obtained by applying the solution on glass, aluminum, and steel panels, drying and curing at 300° F. for 30 minutes. The coatings show good film length and resistance to ethoxyethyl acetate.

*Example 5*

The procedure of Examples 1 and 4 are repeated substituting for the aminoplast solution in each case 70 parts of a 60% solution in n-butanol of a butylated trimethylol melamine (like Resin A of 2,681,897). Hard, clear, insoluble, heat-resistant coatings are obtained.

*Example 6*

One hundred parts of a 50% solution in ethoxyethyl acetate of a copolymer of 97% of methyl methacrylate and 3% of itaconic acid and 10 parts of a 60% solution in n-butanol of butylated trimethylol melamine are dissolved in 250 parts of ethoxyethyl acetate. Coatings on steel panels are dried and cured at 325° F. for 35 minutes. Clear, hard coatings are obtained.

*Example 7*

Titanium dioxide is ground in ethoxyethyl acetate to form a paste which is added to the mixtures obtained in Examples 1, 4, and 6 to provide a binder to pigment ratio in each case of 1:2, 1:4, and 1:5 respectively. Coatings obtained on steel panels by spraying, drying and curing at 350° F. for 20 minutes are glossy, hard solvent-resistant, and resistant to heat.

It is to be understood that changes and variations may be made without departing from the spirit and scope of the invention as defined in the appended claims.

I claim:

1. A composition comprising a solution in an organic solvent of (a) 5 to 95 parts by weight of a linear water-insoluble thermoplastic copolymer of 1 to 10 mole percent of an acid selected from the group consisting of acrylic acid, methacrylic acid, and itaconic acid and 90 to 99 mole percent of at least one alkyl ester of one of said acids in which the alkyl group contains 1 to 18 carbon atoms, and (b) 95 to 5 parts by weight respectively of a resin-forming alkylated condensate of formaldehyde with a compound selected from the group consisting of urea and aminotriazines, said alkylated condensate containing alkoxymethyl groups having from 2 to 19 carbon atoms, the amount of condensate being at least sufficient to provide 1.5 equivalents of oxymethyl per equivalent of carboxyl in the copolymer.

2. A composition comprising a solution in an organic solvent of (a) 5 to 95 parts by weight of a linear water-insoluble thermoplastic copolmer of 1 to 10 mole percent of methacrylic acid and 90 to 99 mole percent of at least one alkyl ester of an acid selected from the group consisting of acrylic acid, methacrylic acid, and itaconic acid in which the alkyl group has from 1 to 18 carbon atoms, and (b) 95 to 5 parts by weight respectively of a resin-forming alkylated condensate of formaldehyde with a compound selected from the group consisting of urea and aminotriazines, said alkylated condensate containing alkoxymethyl groups having from 2 to 7 carbon atoms, the amount of condensate being at least sufficient to provide 1.5 equivalents of oxymethyl per equivalent of carboxyl in the copolymer.

3. A composition comprising a solution in an organic solvent of 5 to 95 parts by weight of a linear water-insoluble thermoplastic copolymer of 1 to 10 mole percent of acrylic acid and 90 to 99 mole percent of at least one alkyl ester of an acid selected from the group consisting of acrylic acid, methacrylic acid, and itaconic acid in which the alkyl group has from 1 to 18 carbon atoms and 95 to 5 parts by weight respectively of an alkoxymethylurea aminoplast in which the alkoxymethyl group has from 2 to 7 carbon atoms, the amount of aminoplast being at least sufficient to provide 1.5 equivalents of oxymethyl per equivalent of carboxyl in the copolymer.

4. A composition comprising a solution in an organic solvent of (a) 50 to 65 parts by weight of a linear water-insoluble thermoplastic copolymer of 1 to 10 mole percent of an acid selected from the group consisting of acrylic acid, methacrylic acid, and itaconic acid and 90 to 99 mole percent of at least one alkyl ester of one of said acids in which the alkyl group has from 1 to 18 carbon atoms and (b) 50 to 35 parts by weight respectively of a resin-forming alkylated condensate of formaldehyde with a compound selected from the group consisting of urea and aminotriazines, said alkylated condensate containing alkoxymethyl groups having from 2 to 19 carbon atoms, the amount of condensate being at least sufficient to provide 1.5 equivalents of oxymethyl per equivalent of carboxyl in the copolymer.

5. A composition comprising a solution in an organic solvent of 5 to 95 parts by weight of a linear water-insoluble thermoplastic copolymer of 1 to 10 mole percent of methacrylic acid and 90 to 99 mole percent of at least one alkyl ester of an acid selected from the group consisting of acrylic acid, methacrylic acid, and itaconic acid in which the alkyl group has from 1 to 18 carbon atoms and 95 to 5 parts by weight respectively of an alkoxymethylmelamine aminoplast in which the alkoxymethyl group has from 2 to 7 carbon atoms, the amount of aminoplast being at least sufficient to provide 1.5 equivalents of oxymethyl per equivalent of carboxyl in the copolymer.

6. A composition comprising a solution in an organic solvent of 5 to 95 parts by weight of a linear water-insoluble thermoplastic copolymer of 1 to 10 mole percent of methacrylic acid and 90 to 99 mole percent of at least one alkyl ester of an acid selected from the group consisting of acrylic acid, methacrylic acid, and itaconic acid in which the alkyl group has from 1 to 18 carbon atoms and 95 to 5 parts by weight respectively of an alkoxymethylbenzoguanamine aminoplast in which the alkoxymethyl group has from 2 to 7 carbon atoms, the amount of aminoplast being at least sufficient to provide 1.5 equivalents of oxymethyl per equivalent of carboxyl in the copolymer.

7. A composition comprising a solution in an organic solvent of 5 to 95 parts by weight of a linear water-insoluble thermoplastic copolymer of 1 to 10 mole percent of acrylic acid and 90 to 99 mole percent of at least one alkyl ester of an acid selected from the group consisting of acrylic acid, methacrylic acid, and itaconic acid in which the alkyl group has from 1 to 18 carbon atoms and 95 to 5 parts by weight respectively of an alkoxymethylbenzoguanamine aminoplast in which the alkoxymethyl group has from 2 to 7 carbon atoms, the amount of aminoplast being at least sufficient to provide 1.5 equivalents of oxymethyl per equivalent of carboxyl in the copolymer.

8. A composition comprising a solution in an organic solvent of 5 to 95 parts by weight of a linear water-insoluble thermoplastic copolymer of 1 to 10 mole percent of acrylic acid and 90 to 99 mole percent of at least one alkyl ester of an acid selected from the group consisting of acrylic acid, methacrylic acid, and itaconic acid in which the alkyl group has from 1 to 18 carbon atoms and 95 to 5 parts by weight respectively of an alkoxymethylmelamine aminoplast in which the alkoxymethyl group has from 2 to 7 carbon atoms, the amount of aminoplast being at least sufficient to provide 1.5 equivalents of oxymethyl per equivalent of carboxyl in the copolymer.

9. A composition comprising a solution in an organic solvent of 5 to 95 parts by weight of a linear water-insoluble thermoplastic copolymer of 1 to 10 mole percent of methacrylic acid and 90 to 99 mole percent of at least one alkyl ester of an acid selected from the group consisting of acrylic acid, methacrylic acid, and itaconic acid in which the alkyl group has from 1 to 4 carbon atoms and 95 to 5 parts by weight respectively of an alkoxymethylurea aminoplast in which the alkoxymethyl group has from 2 to 5 carbon atoms, the amount of aminoplast being at least sufficient to provide 1.5 equivalents of oxymethyl per equivalent of carboxyl in the copolymer.

10. A composition comprising a solution in an organic solvent of 5 to 95 parts by weight of a linear water-insoluble thermoplastic copolymer of 1 to 10 mole percent of acrylic acid and 90 to 99 mole percent of at least one alkyl ester of an acid selected from the group consisting of acrylic acid, methacrylic acid, and itaconic acid in which the alkyl group has from 1 to 4 carbon atoms and 95 to 5 parts by weight respectively of an alkoxymethylurea aminoplast in which the alkoxymethyl group has from 2 to 5 carbon atoms, the amount of aminoplast being at least sufficient to provide 1.5 equivalents of oxymethyl per equivalent of carboxyl in the copolymer.

11. A composition comprising a solution in an organic solvent of 5 to 95 parts by weight of a linear water-insoluble thermoplastic copolymer of 1 to 10 mole percent of itaconic acid and 90 to 99 mole percent of at least one alkyl ester of an acid selected from the group consisting of acrylic acid, methacrylic acid, and itaconic acid in which the alkyl group has from 1 to 4 carbon atoms and 95 to 5 parts by weight respectively of an alkoxymethylurea aminoplast in which the alkoxymethyl group has from 2 to 5 carbon atoms, the amount of aminoplast being at least sufficient to provide 1.5 equivalents of oxymethyl per equivalent of carboxyl in the copolymer.

12. A composition comprising a solution in an organic solvent of 5 to 95 parts by weight of a linear water-insoluble thermoplastic copolymer of 1 to 10 mole percent of methacrylic acid and 90 to 99 mole percent of at least one alkyl ester of an acid selected from the group consisting of acrylic acid, methacrylic acid, and itaconic acid in which the alkyl group has from 1 to 4 carbon atoms and 95 to 5 parts by weight respectively of an alkoxymethylmelamine aminoplast in which the alkoxymethyl group has from 2 to 5 carbon atoms, the amount of aminoplast being at least sufficient to provide 1.5 equivalents of oxymethyl per equivalent of carboxyl in the copolymer.

13. A composition comprising a solution in an organic solvent of 5 to 95 parts by weight of a linear water-insoluble thermoplastic copolymer of 1 to 10 mole percent of methacrylic acid and 90 to 99 mole percent of at least one alkyl ester of an acid selected from the group consisting of acrylic acid, methacrylic acid, and itanconic acid in which the alkyl group has from 1 to 4 carbon atoms and 95 to 5 parts by weight respectively of an alkoxymethylbenzoguanamine aminoplast in which the alkoxymethyl group has from 2 to 5 carbon atoms, the amount of aminoplast being at least sufficient to provide 1.5 equivalents of oxymethyl per equivalent of carboxyl in the copolymer.

14. A composition comprising a solution in an organic solvent of 5 to 95 parts by weight of a linear water-insoluble thermoplastic copolymer of 1 to 10 mole percent of acrylic acid and 90 to 99 mole percent of at least one alkyl ester of an acid selected from the group consisting of acrylic acid, methacrylic acid, and itaconic acid in which the alkyl group has from 1 to 4 carbon atoms and 95 to 5 parts by weight respectively of an alkoxymethylbenzoguanamine aminoplast in which the alkoxymethyl group has from 2 to 5 carbon atoms, the amount of aminoplast being at least sufficient to provide 1.5 equivalents of oxymethyl per equivalent of carboxyl in the copolymer.

15. A composition comprising a solution in an organic solvent of 5 to 95 parts by weight of a linear water-insoluble thermoplastic copolymer of 1 to 10 mole percent of acrylic acid and 90 to 99 mole percent of at least one alkyl ester of an acid selected from the group consisting of acrylic acid, methacrylic acid, and itaconic acid in which the alkyl group has from 1 to 4 carbon atoms and 95 to 5 parts by weight respectively of an alkoxymethylmelamine aminoplast in which the alkoxymethyl group has from 2 to 5 carbon atoms, the amount of aminoplast being at least sufficient to provide 1.5 equivalents of oxymethyl per equivalent of carboxyl in the copolymer.

16. A composition comprising a solution in an organic solvent of 5 to 95 parts by weight of a linear water-insoluble thermoplastic copolymer of 1 to 10 mole percent of methacrylic acid and 90 to 99 mole percent of a mixture of ethyl acrylate and methyl methacrylate and 95 to 5 parts by weight respectively of a butylated methylolated urea aminoplast, the amount of aminoplast being at least sufficient to provide 1.5 equivalents of oxymethyl per equivalent of carboxyl in the copolymer.

17. A composition comprising a solution in an organic solvent of 5 to 95 parts by weight of a linear water-insoluble thermoplastic copolymer of 1 to 10 mole percent of methacrylic acid and 90 to 99 mole percent of a mixture of ethyl acrylate and methyl methacrylate and 95 to 5 parts by weight respectively of a butylated methylolated melamine aminoplast, the amount of aminoplast being at least sufficient to provide 1.5 equivalents of oxymethyl per equivalent of carboxyl in the copolymer.

18. A composition comprising a solution in an organic solvent of 5 to 95 parts by weight of a linear water-insoluble thermoplastic copolymer of 1 to 10 mole percent of methacrylic acid and 90 to 99 mole percent of a mixture of ethyl acrylate and methyl methacrylate and 95 to 5 parts by weight respectively of a butylated methylolated benzoguanamine aminoplast, the amount of aminoplast being at least sufficient to provide 1.5 equivalents of oxymethyl per equivalent of carboxyl in the copolymer.

19. A composition comprising a solution in an organic solvent of 5 to 95 parts by weight of a linear water-insoluble thermoplastic copolymer of 1 to 10 mole percent of acrylic acid and 90 to 99 mole percent of a mixture of ethyl acrylate and methyl methacrylate and 95 to 5 parts by weight respectively of a butylated methylolated urea aminoplast, the amount of aminoplast being at least sufficient to provide 1.5 equivalents of oxymethyl per equivalent of carboxyl in the copolymer.

20. A composition comprising a solution in an organic solvent of 5 to 95 parts by weight of a linear water-insoluble thermoplastic copolymer of 1 to 10 mole percent of acrylic acid and 90 to 99 mole percent of a mixture of ethyl acrylate and methyl methacrylate and 95 to 5 parts by weight respectively of a butylated methylolated benzoguanamine aminoplast, the amount of aminoplast being at least sufficient to provide 1.5 equivalents of oxymethyl per equivalent of carboxyl in the copolymer.

21. A composition comprising a solution in an organic solvent of (a) 5 to 95 parts by weight of a linear water-insoluble thermoplastic copolymer of 1 to 10 mole percent of an acid selected from the group consisting of acrylic acid, methacrylic acid, and itaconic acid, and 90 to 99 mole percent of at least one alkyl ester of one of said acids in which the alkyl group contains 1 to 18 carbon atoms, and (b) 95 to 5 parts by weight respectively of a resin-forming alkylated condensate of formaldehyde with an aminotriazine, said alkylated condensate containing alkoxymethyl groups having from 2 to 19 carbon atoms, the amount of condensate being at least sufficient to provide 1.5 equivalents of oxymethyl per equivalent of carboxyl in the copolymer.

22. A composition comprising a solution in an organic solvent of (a) 50 to 65 parts by weight of a linear water-insoluble thermoplastic copolymer of 1 to 10 mole percent of an acid selected from the group consisting of acrylic acid, methacrylic acid, and itaconic acid, and 90 to 99 mole percent of at least one alkyl ester of one of said acids in which the alkyl group contains 1 to 18 carbon atoms, and (b) 50 to 35 parts by weight respectively of a resin-forming alkylated condensate of formaldehyde with an aminotriazine, said alkylated condensate containing alkoxymethyl groups having from 2 to 19 carbon atoms, the amount of condensate being at least sufficient to provide 1.5 equivalents of oxymethyl per equivalent of carboxyl in the copolymer.

23. A process for the preparation of high gloss protective coatings which comprises coating a substrate with a film forming solution of (1) a carboxy copolymer of (a) a vinylidene compound selected from the group consisting of alkyl esters of acrylic and methacrylic acids, each alkyl group having not more than twelve carbon atoms, and (b) a monocarboxylic acid selected from the group consisting of acrylic acid and methacrylic acid, the acid constituting 5 to 10.2 percent of the copolymer and (2) an aldehydeammonia derivative selected from the group consisting of fusible, alkylated aldehyde-urea and alkylated aldehyde-melamine condensates, and heating the film at a temperature sufficient to cure the film, wherein the solvent is a member of the group consisting of saturated aromatic hydrocarbon, ester and ketone solvents and wherein the carboxy copolymer constitutes 40 to 95 percent of (1) and (2).

References Cited by the Examiner

UNITED STATES PATENTS

| 2,160,054 | 5/39 | Bauer et al. | 260—45.2 |
| 2,173,005 | 9/39 | Strain | 260—45.2 |
| 2,537,019 | 1/51 | Barrett | 260—45.2 |
| 2,557,266 | 6/51 | Dittmar et al. | 260—45.2 |
| 2,931,742 | 4/60 | Hicks | 260—45.2 |

FOREIGN PATENTS 411,860  6/43  Great Britain.

MURRAY TILLMAN, *Primary Examiner.*

D. ARNOLD, L. H. GASTON, LEON J. BERCOVITZ, *Examiners.*